US012238604B2

(12) United States Patent
Chandrasekaran et al.

(10) Patent No.: US 12,238,604 B2
(45) Date of Patent: Feb. 25, 2025

(54) ENFORCING A DYNAMICALLY MODIFIABLE GEOFENCE BASED ON CONDITIONS OF A CELLULAR NETWORK

(71) Applicant: Palo Alto Networks, Inc., Santa Clara, CA (US)

(72) Inventors: Arun Athrey Chandrasekaran, Milpitas, CA (US); Avaneesh Anandrao Kadam, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 381 days.

(21) Appl. No.: 17/655,728

(22) Filed: Mar. 21, 2022

(65) Prior Publication Data

US 2023/0300560 A1    Sep. 21, 2023

(51) Int. Cl.
| | |
|---|---|
| *H04L 12/00* | (2006.01) |
| *G01S 5/00* | (2006.01) |
| *H04B 17/318* | (2015.01) |
| *H04W 4/021* | (2018.01) |
| *H04W 24/10* | (2009.01) |

(52) U.S. Cl.
CPC ........... *H04W 4/021* (2013.01); *G01S 5/0063* (2013.01); *H04B 17/318* (2015.01); *H04W 24/10* (2013.01)

(58) Field of Classification Search
CPC ..... H04W 4/021; H04W 4/022; H04W 24/10; H04B 17/364; G01S 5/0063
USPC ....................................................... 370/329
See application file for complete search history.

(56) References Cited

U.S. PATENT DOCUMENTS

| | | | |
|---|---|---|---|
| 10,405,133 B1 * | 9/2019 | Merjanian | ............... H04W 4/90 |
| 10,405,136 B2 | 9/2019 | Zises | |
| 10,605,472 B2 | 3/2020 | Sekar et al. | |

(Continued)

FOREIGN PATENT DOCUMENTS

WO    WO-2018200332 A1 *   11/2018   ............. H04L 61/35

OTHER PUBLICATIONS

International Application No. PCT/US2023/063831, International Search Report mailed May 17, 2023, 3 pages.

(Continued)

*Primary Examiner* — Frantz Coby
(74) *Attorney, Agent, or Firm* — Gilliam IP PLLC

(57) ABSTRACT

A geofencing service establishes an initial geofence for monitoring devices connected to a cellular network. Upon receipt of a notification generated and transmitted by a device that crossed the geofence, the service determines a difference in location of the device at the times of notification generation and transmission based on coordinates included in the notification. A difference in location that satisfies a criterion indicates that the geofence corresponds to a geographic location with poor cellular network connectivity. The service modifies the geofence radius based on available signal strength data and enforces the resulting modified geofence. After this first radius modification, the service determines quality of network connectivity at geographic locations corresponding to internally tracked "shadow" geofences and modifies the geofence radius if device coordinates indicate that a shadow geofence corresponds to an area with sufficient connectivity. Geofence radius modification is ongoing until the geofence is returned to its initial configuration.

20 Claims, 7 Drawing Sheets

(56) References Cited

U.S. PATENT DOCUMENTS

| | | | | |
|---|---|---|---|---|
| 2016/0266258 A1* | 9/2016 | Huang | ............... | G01S 19/34 |
| 2017/0230791 A1* | 8/2017 | Jones | ............... | H04L 9/088 |
| 2019/0253835 A1* | 8/2019 | Jones | ............... | G06F 21/604 |
| 2019/0387356 A1* | 12/2019 | Branscomb | ............... | H04W 12/64 |
| 2022/0070610 A1* | 3/2022 | Jones | ............... | H04L 9/088 |
| 2023/0090938 A1* | 3/2023 | Jones | ............... | H04L 67/52 |
| | | | | 709/224 |
| 2023/0300560 A1* | 9/2023 | Chandrasekaran | ... | G01S 5/0063 |
| | | | | 370/329 |

OTHER PUBLICATIONS

International Application No. PCT/US2023/063831, Written Opinion of the ISA mailed May 17, 2023, 7 pages.
PCT Application No. PCT/US2023/063831, International Preliminary Report on Patentability mailed Feb. 23, 2024, 7 pages.

\* cited by examiner

ENFORCING A DYNAMICALLY MODIFIABLE GEOFENCE BASED ON CONDITIONS OF A CELLULAR NETWORK

BACKGROUND

The disclosure generally relates to wireless communication networks and to services making use of location information.

Geofencing is a technique by which a virtual perimeter is established for monitoring locations of devices with respect to a geographic area. With geofencing, radio frequency identification (RFID), Wi-Fi, Global Positioning System (GPS) data, or cellular data is used to monitor the location of a device having location services enabled. One or more actions such as alerts can be defined that are triggered when the device is determined to have crossed the virtual perimeter established through geofencing.

BRIEF DESCRIPTION OF THE DRAWINGS

Aspects of the disclosure may be better understood by referencing the accompanying drawings.

DESCRIPTION

Figure 1:
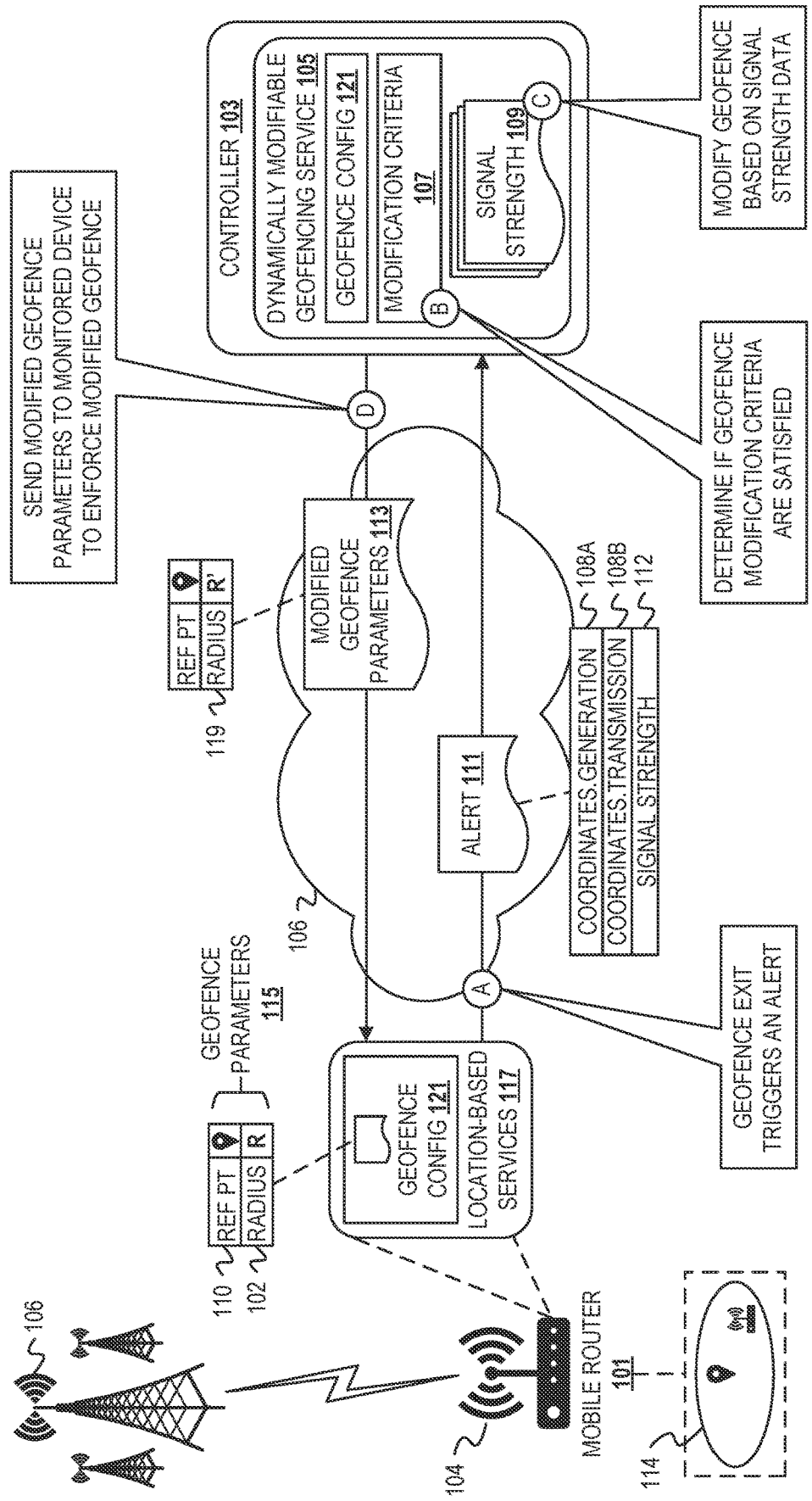
FIG. 1 is a conceptual diagram of dynamically modifying a geofence based on observed conditions of a cellular network.

The description that follows includes example systems, methods, techniques, and program flows that embody aspects of the disclosure. However, it is understood that this disclosure may be practiced without these specific details. For instance, this disclosure refers to enforcing the dynamically modifiable geofence for software-defined wide area network (SD-WAN) edge routers, where the edge routers are mobile/cellular routers, in illustrative examples. Aspects of this disclosure can be also applied to other devices that connect to a cellular network or mobile/cellular routers that are not configured as SD-WAN edge routers. In other instances, well-known instruction instances, protocols, structures and techniques have not been shown in detail in order not to obfuscate the description.

Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. In more general terms, a cloud service provider resource accessible to customers is a resource owned/managed by the cloud service provider entity that is accessible via network connections. Often, the access is in accordance with an application programming interface or software development kit provided by the cloud service provider.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Effectively providing geofencing services for mobile network devices (e.g., mobile/cellular routers) can be challenging due to variations in cellular network connectivity. Alerts generated from geofence enter/exit events may be delayed or missed due to poor or temporary loss of network connectivity at a location corresponding to the geofence. If a mobile network device crosses a geofence at a location that has poor network connectivity, such as due to a temporary network outage, delivery of an alert indicative of the exit/entry event to a service monitoring the location of the mobile network device over the cellular network may be delayed. Actions taken in response by a customer or other owner of the mobile network devices to address the geofence crossing event may also be delayed as a result. In some instances, delays in alerting triggered by geofence entry or exit events may present a security issue.

Described herein is a geofencing service for enforcing a dynamically modifiable geofence based on observed conditions of a cellular network. For geofencing provided for a SD-WAN, the geofencing service can execute as part of the SD-WAN controller to enforce a geofence for edge routers that comprise mobile/cellular routers. The geofencing service establishes a geofence having an initial configuration that comprises a central location and a radius of the geofence relative to the central location. Alerts sent to the geofencing service by devices crossing the geofence indicate two device locations captured by the devices' location-based services (e.g., with GPS coordinates): a location at which the alert was generated, which substantially corresponds to a site along the geofence, and a location at which the alert was transmitted to the geofencing service over the cellular network. When devices have a sufficiently strong connection to the cellular network, the locations are expected to be substantially similar. Differences in locations that indicate a delay between alert generation and transmission, however, may be attributable to poor or no signal of the cellular network where the geofence was crossed. The geofencing service records an error case upon identifying such differences. Once a designated number of error cases (i.e., 1 to N error cases) has been recorded, modification of the geofence radius is triggered. The geofencing service modifies the geofence radius based on available signal strength data so that the modified geofence corresponds to sites with improved signal strength of the cellular network.

After this first radius modification, the geofencing service determines network connectivity and identifies delays in transmission of internal alerts at sites corresponding to a plurality of internally tracked "shadow" geofences based on similar analyses of device locations between alert generation and transmission. These geofences are considered shadow geofences since they overlay the actual, enforced geofence but are for internal use by the geofencing service and are not presented to or configured by the customer. Shadow geofences are configured with radii that may be between the value of the modified geofence radius and the initial geofence radius so that subsequently triggered geofence modifications serve to revert the geofence radius to or closer to that specified in the initial configuration of the geofence. As devices cross shadow geofences and trigger alerting to the geofencing service, if the change in device location between alert generation and transmission is minimal (i.e., not an error case) for a shadow geofence, the geofencing service modifies the radius of the actual geofence based on the radius of the shadow geofence that was crossed. Geofence modification based on the shadow geofence triggers is ongoing until the radius is returned to its original value and the initially configured geofence can be again enforced due to corresponding connectivity to the cellular network being restored.

Example Illustrations

FIG. 1 is a conceptual diagram of dynamically modifying a geofence based on observed conditions of a cellular network. A mobile router 101 is connected to a cellular network 106 and creates a Wi-Fi network 104. The mobile router 101 creates the Wi-Fi network 104 by converting cellular signals of the cellular network 106 to Wi-Fi signals. The Wi-Fi network 104 is a wireless local area network (WLAN) based on the Institute of Electrical and Electronics Engineers (IEEE) 802.11 technical standards. The cellular network 106 may be a 4G network, 4G Long-Term Evolution (LTE) network, 5G network, etc. The mobile router 101 allows Wi-Fi compatible devices in range of the Wi-Fi network 104 to connect to the Wi-Fi network 104 and access the Internet via the cellular network 106. Internet access is therefore dependent on the mobile router 101 having a sufficiently strong signal for the cellular network 106.

The mobile router 101 is configured and managed by a controller 103. The controller 103 may be a SD-WAN controller that executes in a cloud environment (e.g., as a cloud-based service). The controller 103 and the mobile router 101 can communicate bidirectionally via the cellular network 106 to which the mobile router 101 is connected. A dynamically modifiable geofencing service 105 (hereinafter "the service 105") executes as part of the controller 103. The service 105 has configured the mobile router 101 with a geofence configuration 121 by which a geofence 114 is enforced for the mobile router 101. The mobile router 101 has previously opted into the use of its location-based services 117 for geofencing, such as through downloading software as part of configuring the mobile router 101 as an edge router managed by the controller 103. The geofence configuration 121 may be downloaded as part of this initial configuration of the mobile router 101. The location-based services 117 are hereinafter referred to as performing the geofencing operations pertaining to the mobile router 101 (e.g., detecting geofence exit events).

The geofence configuration 121 indicates parameters 115 of the geofence 114 (hereinafter "geofence parameters 115") that comprise a reference point 110 and a radius 102, represented in FIG. 1 as having a value of R. The geofence configuration 121 may also specify a geofence exit event (i.e., crossing the geofence 114 to exit the virtually fenced in area) as a trigger condition that triggers alerting to the service 105 if satisfied. After download of the geofence configuration 121 to the mobile router 101, if the mobile router 101 exits a "geofenced" area encompassed by the geofence 114, the location-based services 117 will alert the service 105 of the geofence exit event. The geofence parameters 115 and other aspects of the geofence configuration 121 may have been specified by a customer, such as an owner of the mobile router 101. For instance, a customer may have input the geofence parameters 115 and an indication of exit events as an alert trigger into a user-facing component of the service 105, after which the service 105 generates the geofence configuration 121 based on the input configuration parameters and pushes the geofence configuration 121 to the mobile router 101 and any other serviced devices. As another example, the customer may have installed the geofence configuration 121 on the service 105 so the geofence configuration 121 can be pushed to the mobile router 101 and any other serviced devices.

The service 105 also maintains and/or has access to signal strength data 109 of the cellular network 106. The service 105 may have obtained the signal strength data 109 from the Internet service provider ("ISP") that provides Internet access via the cellular network 106. Alternatively, or in addition, the service 105 may build and maintain the signal strength data 109 as monitored devices including the mobile router 101 transmit alerts comprising their current location and corresponding signal strength to the service 105. The signal strength data 109 may be maintained locally by the service 105 or may be stored in an external location to which the service 105 has access (e.g., a repository maintained on an external server, such as a cloud server).

FIG. 1 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, a geofence exit event by the mobile router 101 triggers generation of an alert 111 that is transmitted to the service 105 over the cellular network 106. When the mobile router 101 crosses the geofence 114, the location-based services 117 detects the geofence exit event. The geofence configuration 121 further configures the location-based services 117 to determine and include data corresponding to both generation of the alert 111 and transmission of the alert 111 over the cellular network 106. When the alert 111 is generated locally by the location-based services 117, the location-based services 117 capture first coordinates 108A of the mobile router 101 (e.g., using GPS) that correspond to the location at which the mobile router 101 exited the geofence 114 and include the first coordinates 108A in the alert 111. In some examples such as that depicted in FIG. 1, the location-based services 117 can also determine a signal strength 112 that indicates a strength of the cellular network 106 signal measured by the mobile router 101 at the location corresponding to the first coordinates 108A. The location-based services 117 may generate the alert 111 with the first coordinates 108A and signal strength 112 as data. Prior to transmitting the alert 111 over the cellular network 106 to the service 105, the location-based services 117 capture second coordinates 108B of the mobile router 101 that correspond to the location of the mobile router 101 when the alert 111 is transmitted over the cellular network 106. The location-based services 117 may add the second coordinates 108B to the alert 111 as metadata.

Under expected conditions of the cellular network 106 in which the mobile router 101 has a sufficiently strong connection to the cellular network 106, the first and second coordinates 108A-B should be substantially similar due to inconsequential delay between generating and transmitting the alert 111. However, if the signal measured by the mobile router 101 is weak or absent at the location corresponding to the geofence exit event (i.e., indicated by the first coordinates 108A), a delay between local generation of the alert 111 and transmission of the alert 111 over the cellular network 106 may exist. Inclusion of coordinates indicating locations of the mobile router 101 at the times of both generation and transmission of the alert 111 facilitates analysis of whether such a delay was present, which is performed at stage B.

At stage B, the service 105 receives and analyzes the alert 111 based on criteria 107 for modifying the geofence 114. Modifying a geofence refers to redefining the geofence by modifying its radius. The criteria 107 indicate one or more criteria that, if satisfied, trigger modification of the geofence 114. The criteria 107 can include at least a first threshold that corresponds to a distance between the locations corresponding to alert generation and transmission; a distance exceeding the threshold indicates that insufficient signal strength of the cellular network 106 may be causing delays between generating and transmitting alerts. The service 105 identifies the first and second coordinates 108A-B from the alert 111 and computes the distance therebetween for evaluation against the first threshold indicated by the criteria 107. If the distance exceeds the threshold, as is assumed to be the case in this example, the service 105 records an error case (e.g., in a data structure(s) maintained for recording error cases).

To prevent premature modification of a geofence due to temporary losses or reductions in signal strength, the criteria 107 may further comprise a second threshold corresponding to a maximum count of error cases that should be recorded before a geofence modification is triggered. As an example, the criteria 107 may further dictate that a geofence should be modified after more than five error cases are recorded. Thus, after recording an error case, the service 105 evaluates a count of error cases that has been recorded against this second threshold; if the second threshold is exceeded, a geofence modification is triggered due to satisfaction of the criteria 107. This example assumes that the error case recorded after the distance between the first and second coordinates 108A-B exceeded the error case count threshold, which triggers modification of the geofence 114 by the service 105.

As part of handling the alert 111, the service 105 also determines the signal strength 112 included in the alert 111 and updates the signal strength data 109 with an indication of the signal strength 112 and corresponding location (i.e., the first coordinates 108A). The signal strength data 109 may be maintained in a heat map in some examples, where different hues in the heat map correspond to different classes of signal strength. In this case, the service 105 can determine to which of the classes the signal strength 112 corresponds and classify the signal strength 112 into the determined class by associating the signal strength 112 with the respective hue indicative of the class. In other examples, signal strength measurements may be classified on entry into the signal strength data 109 based on evaluation against classification criteria, where each class is associated with a hue that will be used for representing the signal strength. As another example, the signal strength data 109 may comprise a plurality of indications of locations (e.g., GPS coordinates) and the associated signal strength at each location. Each of the signal strength data 109 may be labeled, tagged, or otherwise annotated with a signal strength class that the service 105 determines on insertion into the data set. For instance, each of the signal strength data 109 can indicate GPS coordinates, a signal strength measurement determined from a received alert, and a label indicating a class into which the service 105 classified the signal strength measurement.

At stage C, the service 105 determines a modification to the geofence 114 through modification to the radius 102 based on the signal strength data 109 of the cellular network 106. The service 105 determines a reduced geofence radius from analysis of the signal strength data 109, where the reduced radius is the next largest geofence radius that corresponds to locations of sufficient signal strength. The service 105 initializes a radius value R' with the value of the radius 102, determines whether those of the signal strength data 109 corresponding to locations at the distance R' from the reference point 110 correspond to a sufficiently strong signal of the cellular network 106, and decrements the value of R' if the signal strength is insufficient. The analysis of the signal strength data 109 with decrementing values of R' is performed until the value of R' yields a finding of sufficient signal strength. As an example, if the radius 102 has a value of 1000 meters and R' is to be decremented by 50 meters, the service 105 can determine and analyze those of the signal strength data 109 corresponding to locations 950 meters from the reference point 110, 900 meters from the reference point 110, etc. Upon determining that the radius R' corresponds to locations of sufficient signal strength, the service 105 sets a modified radius 119 of the geofence 114 with the value of R'.

Whether the signal strength of the cellular network 106 is sufficient can be based on a criterion against which the service 105 evaluates the subset of the signal strength data 109 that corresponds to geographic locations of the boundary formed by the geofence with radius R'. For instance, the service 105 may maintain a threshold that indicates a signal strength value that is considered sufficient, and signal strength values that fail to exceed this threshold are deemed insufficient. As another example, if the signal strength data 109 are represented with a heat map, the service 105 may maintain indications of hues corresponding to signal strengths that are considered sufficient (e.g., the color(s) that represent signal strength measurements over −85 decibel milliwatts). Since the available signal strength measurements for locations corresponding to a geofence with the radius R' may vary or be limited, the service 105 may determine that signal strength corresponding to the radius R' is sufficient if a certain percentage, proportion, etc. of the associated signal strength measurements are deemed sufficient. As an example, for a percentage of 80%, the service 105 may determine the subset of the signal strength data 109 that corresponds to locations at a distance R' from the reference point 110 and evaluate the measurements to determine whether at least 80% of the measurements are indicative sufficient signal strength. Further, the service 105 may maintain a tolerance value so that locations corresponding to the geofence with the radius R' plus or minus the tolerance value are considered in the evaluation. The tolerance value may be in terms of the unit by which R' is measured or by which locations are indicated in the signal strength data, such as meters or seconds of latitude/longitude, respectively.

At stage D, the service 105 communicates an update to the mobile router 101 that indicates modified geofence parameters 113, which comprise the modified radius 119. The update that the service communicates to the mobile router 101 may be a new configuration, such as an updated version of the geofence configuration 121 that indicates the modified geofence parameters 113, or an update to the existing geofence configuration 121. The location-based services 117 installs the update comprising the modified geofence parameters 113 to the mobile router 101 once the update has been received. The geofence that is then enforced for the mobile router 101 will have a radius given by the modified radius 119.

Figure 2:
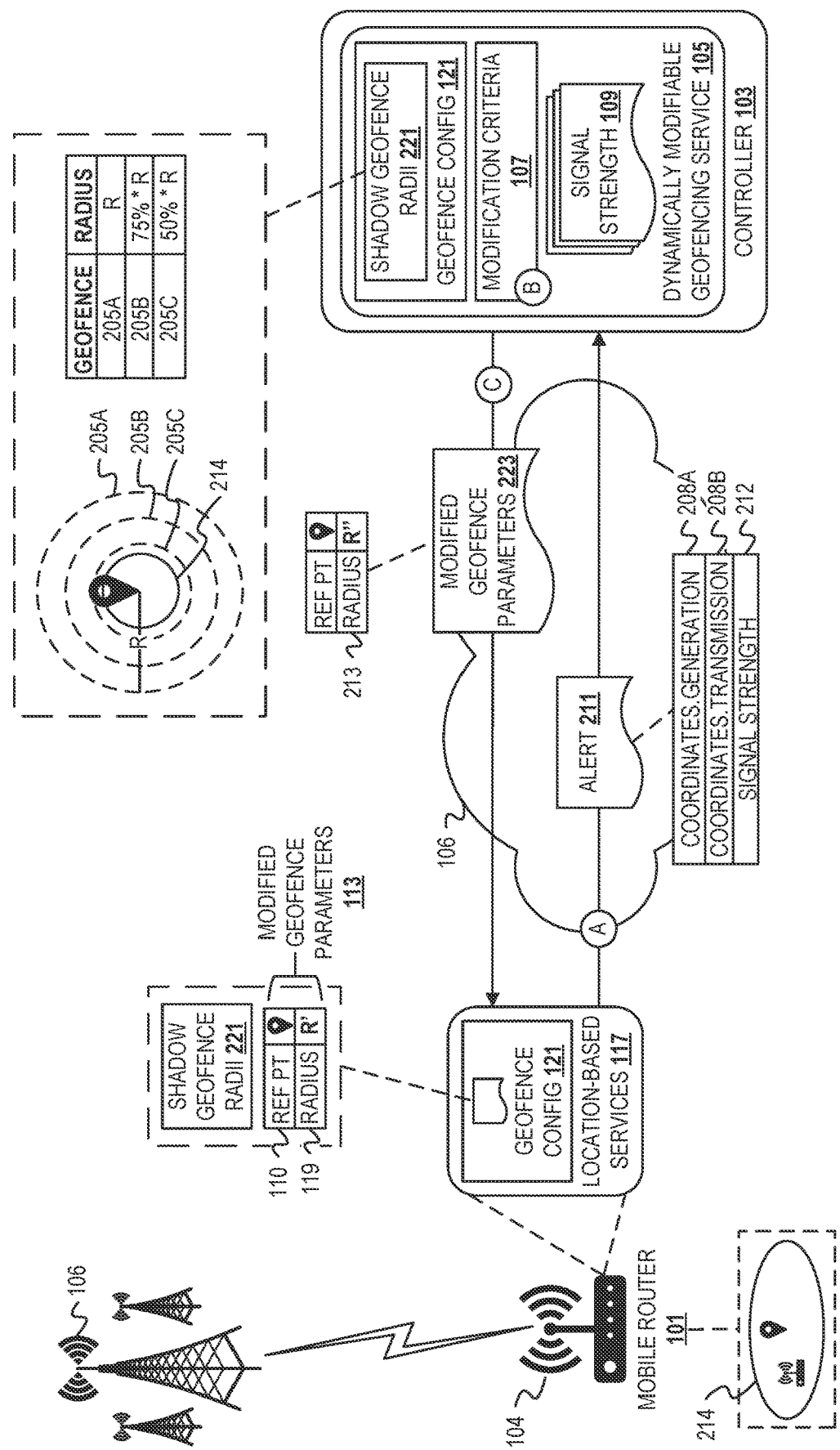
FIG. 2 is a conceptual diagram of ongoing geofence modification to revert to the initially configured geofence.

FIG. 2 is a conceptual diagram of ongoing geofence modification to revert to the initially configured geofence. FIG. 2 depicts the service 105 as enforcing a geofence 214 for the mobile router 101 that has the modified geofence parameters 113 determined as described in reference to FIG. 1. The geofence configuration 121 also comprises radii 221 of a plurality of "shadow geofences." The geofences corresponding to the radii 221 are referred to as shadow geofences because these geofences are not customer-facing and trigger alerts for internal use by the service 105 when crossed. Additionally, shadow geofences overlay the geofence 214, or the geofence that is being enforced and is defined by the modified geofence parameters 113. Each radius of the radii 221 is represented in terms of the radius R with which the geofence was initially configured. The service 105 may communicate the radii 221 to the mobile router 101 as part of the update that includes the modified geofence parameters 113 as described in reference to FIG. 1 so that the corresponding shadow geofences are enforced for internal alerting after the initial geofence modification.

To illustrate, FIG. 2 depicts exemplary values of each of the radii 221 and the corresponding set of shadow geofences. A shadow geofence 205A corresponds to the geofence with radius R (i.e., the radius 102). A shadow geofence 205B corresponds to a geofence with a radius having a value that is 75% of R. A shadow geofence 205C corresponds to a geofence with a radius having a value that is 50% of R. If the mobile router 101 crosses any of the shadow geofences 205A-C, an alert comprising the coordinates of notification generation and transmission as well as signal strength as described in reference to FIG. 1 is generated and transmitted to the service 105 to aid in modifying the geofence based on observed connectivity to the cellular network 106. In contrast, if the mobile router 101 crosses the geofence 214, the resulting alert may be presented to the customer, and the geofence may again be modified based on analysis of the mobile router 101 locations indicated in the alert as described in reference to FIG. 1. The remaining description of FIG. 2 refers to the former case in which the mobile router 101 crosses one of the shadow geofences 205A-C.

FIG. 2 is annotated with a series of letters A-C. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, a geofence exit event by the mobile router 101 for one of the shadow geofences 205A-C triggers generation and transmission of an alert 211 to the service 105. As with the alert 111 of FIG. 1, the alert 211 comprises two coordinates captured by the location-based services 117 (e.g., with GPS). First coordinates 208A determined by the location-based services 117 indicate the location of the mobile router 101 when the mobile router 101 exited the corresponding one of the shadow geofences 205A-C and triggered generation of the alert 211. Second coordinates 208B determined by the location-based services 117 indicate the location of the mobile router 101 just prior to transmitting the alert 211 to the service 105 over the cellular network 106. The alert 211 also comprises an indication of signal strength 212 measured by the mobile router 101.

At stage B, the service 105 receives and analyzes the alert 211. The service 105 determines whether the criteria 107 for geofence modification are satisfied based on the data/metadata of the alert 211. The service 105 also determines the signal strength 212 included in the alert 211 and updates the signal strength data 109 with an indication of the signal strength 212 and corresponding location (i.e., the first coordinates 208A) as similarly described in reference to FIG. 1. When analyzing the data/metadata of the alert 211 based on the criteria 107, the geofence modification triggered by satisfaction of the criteria 107 serves to return the radius to or closer to the value with which it was initially configured (i.e., the radius 102). The criteria 107 can thus comprise first criteria for the initial parameter modification described above and second criteria for subsequent parameter modifications.

The service 105 determines a distance between the locations corresponding to the first coordinates 208A and the second coordinates 208B and evaluates the distance against a threshold indicated by the criteria 107. The threshold against which distances determined from internal alerts triggered by shadow geofence exit events are evaluated may indicate the same distance as the threshold employed for the initial distance evaluation as described above. In this case, however, the service 105 evaluates the distance between the first and second coordinates 208A-B against the threshold to determine whether the distance is below the threshold and there was thus no substantial delay between generation and transmission of the alert 211. If the distance is below the threshold, those of the criteria 107 enforced for shadow geofence exit events are satisfied.

This example assumes that the distance between locations identified by the first and second coordinates 208A-B is below the threshold specified by the criteria 107, which triggers geofence modification by again modifying the geofence radius. When the mobile router 101 crosses one of the shadow geofences 205A-C and ultimately triggers a geofence modification, the geofence is modified to have a radius corresponding to that of the shadow geofence that was crossed. For instance, if the mobile router 101 crossed the shadow geofence 205B, the service 105 determines the modification to the radius based on the radius having the value that is 75% of the initial radius R. The service 105 determines a value of a modified radius 213, depicted in FIG. 2 as R", based on the radius of the shadow geofence that was crossed and triggered the alert 211. The service 105 may determine the value of the modified radius 213 based on a distance between the reference point 110 and the location identified by the first coordinates 208A or based on an indication of the shadow geofence that was included in the alert 211.

At stage C, the service 105 communicates an update to the mobile router 101 that indicates modified geofence parameters 223, which comprise the modified radius 213. The update that the service 105 communicates to the mobile router 101 may be a new configuration, such as an updated version of the geofence configuration 121 that indicates the modified geofence parameters 223, or an update to the existing geofence configuration 121. The mobile router 101 installs the update comprising the modified geofence parameters 223, and the geofence 214 is thus modified to have the modified radius 213 with the value R". Gradual geofence modification with the assistance of the internal alerts triggered by crossing of the shadow geofences 205A-C can continue until connectivity has been restored at the original geofence sites and the geofence radius can be reverted to the radius 102 with which it was configured.

FIGS. 1-2 depict examples of dynamically modifiable geofencing in which geofence exit events are a trigger for alert generation and transmission. In other examples, geofence entry events may be a trigger. In such examples, rather than restricting the geofence as described in reference to FIG. 1 and enforcing shadow geofences having radii measured as less than the originally configured radius as described in reference to FIG. 2, the geofence may be expanded based on signal strength data during the first geofence modification event. Radii of shadow geofences that the service 105 then enforces may be greater than the radius of the initially configured geofence (e.g., 150% and 175% of the initially configured geofence) so that subsequent geofence modification events serve to gradually revert to the initial geofence.

While FIGS. 1 and 2 depict the controller 103 as managing the mobile router 101 for simplicity and to aid in understanding, the controller 103 can manage a plurality of devices (e.g., a plurality of edge routers). For instance, the controller 103 can manage multiple mobile routers and/or other compatible devices that have been onboarded in addition to the mobile router 101. The devices may be grouped by characteristics, where characteristics of devices may include service provider (e.g., ISP of the cellular network), device type, antenna deployment (e.g., internal antenna or externally mounted antenna), or any other device metadata that indicate characteristics that can impact strength of the connection to the cellular network. The controller 103 may maintain or have access to metadata of onboarded mobile routers that include these characteristics pertaining to cellular network connectivity. To configure multiple devices for dynamically modifiable geofencing, the service 105 pushes the geofence configuration 121 to the multiple devices. Alerts that the service 105 then receives based on any of the devices crossing the geofence can originate from any of the multiple devices. The service 105 modifies parameters of the geofence as described above and communicates the modified geofence parameters to devices having the same or similar (e.g., at least partially the same) characteristics as that from which the alert originated, where the similar characteristics are defined as one or more metadata in common among devices.

FIGS. 3-6 are flowcharts of example operations for enforcing a dynamically modifiable geofence based on conditions of a cellular network. The example operations are described with reference to a dynamically modifiable geofencing service (hereinafter "the geofencing service") for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

The example operations refer to enforcement of a dynamically modifiable geofence for one or more devices connected to a cellular network. The devices may be SD-WAN edge devices that are connected to a cellular network, such as mobile routers (also referred to as cellular routers) deployed as edge routers. In implementations in which a dynamically modifiable geofence is enforced for such SD-WAN edge devices, the geofencing service executes as part of the SD-WAN controller.

Additionally, the example operations assume that the geofencing service has access to signal strength data for a cellular network. The signal strength data may have been obtained from an ISP that provides the cellular network and/or from monitored devices that periodically communicate signal strength data to the service (e.g., as part of alerts communicated to the service for geofence crossing events). The signal strength data indicates signal strength of the cellular network associated with various geographic locations. For instance, the signal strength data may be represented with signal strength values, which may be individual values or ranges of values, associated with indications of location (e.g., GPS coordinates). As another example, the signal strength data may be represented with indications of signal quality and associated location, where the signal strength has previously been mapped to a corresponding indication of signal quality (e.g., by the ISP or the service).

Figure 3:
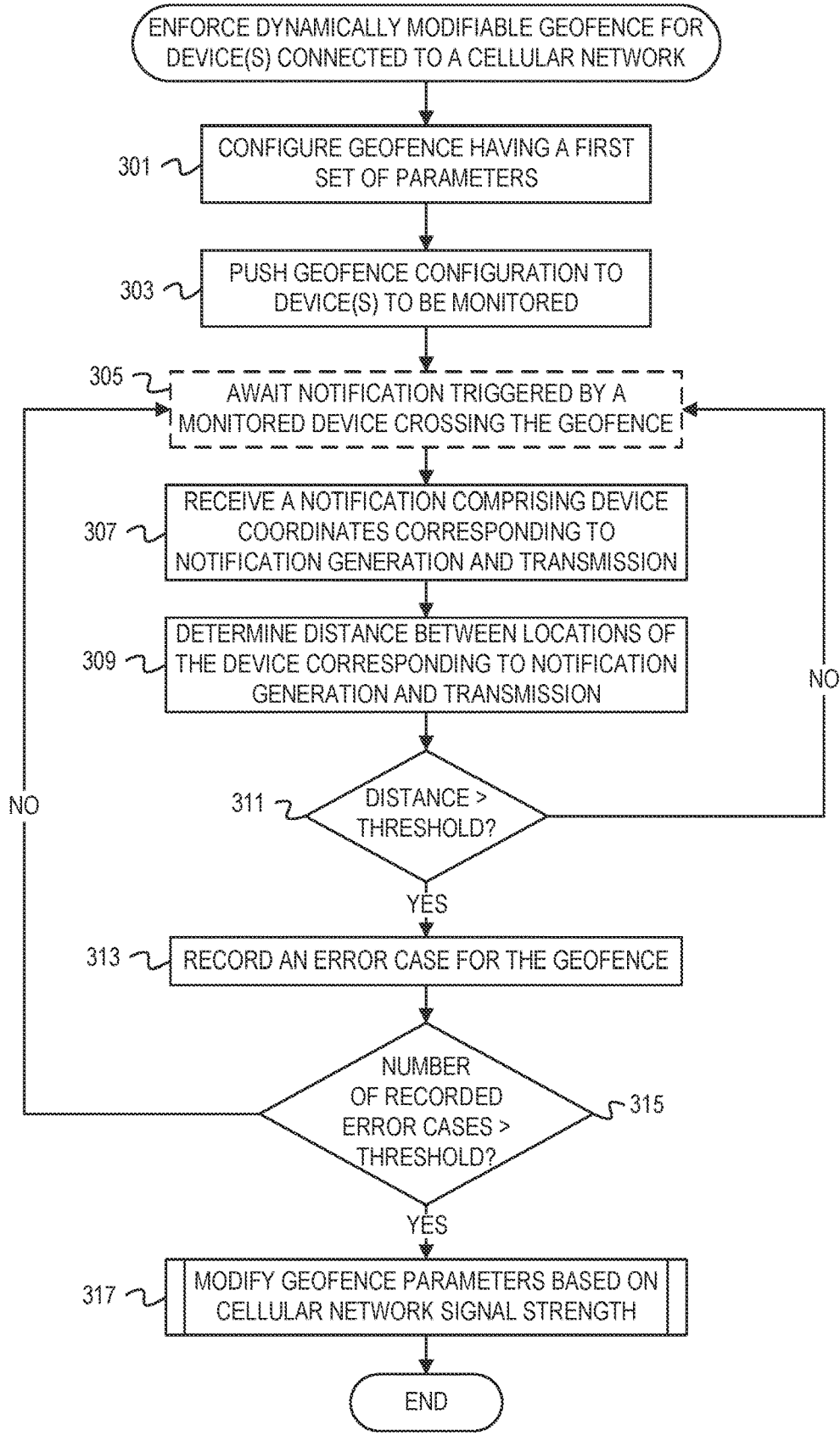
FIG. 3 is a flowchart of example operations for enforcing a dynamically modifiable geofence for a device(s) connected to a cellular network.

FIG. 3 is a flowchart of example operations for enforcing a dynamically modifiable geofence for a device(s) connected to a cellular network. Initial geofence establishment refers to initial configuration of a geofence to be enforced for one or more devices connected to a cellular network. The geofence may initially be configured by a customer or other owner of the one or more devices based on selecting a central location from which the geofence is measured (e.g., a headquarters location) and a radius of the geofence, such as through a user-facing component of a SD-WAN controller on which the geofencing service executes.

At block 301, the geofencing service configures a geofence having a first set of parameters. The initially configured parameters of the geofence comprise a central point around which the geofence is formed and a radius of the geofence. The geofence parameters may have been specified by an owner of the device(s) being monitored through geofencing. For instance, the geofence parameters may have been input into a user-facing component of an SD-WAN controller on which the geofencing service executes in implementations in which the geofence is enforced for SD-WAN edge routers. As another example, a geofence configuration that comprises the geofence parameters may have been installed on the geofencing service (e.g., via installation onto the controller). The geofencing configuration comprising the initially configured parameters may also specify whether geofence entry or geofence exit should trigger alerting. The geofence configuration that is to be installed should further specify that notifications that are generated in response to crossing the geofence are to include two coordinates captured by the devices' location-based services, where the first coordinates are captured on crossing the geofence and the second coordinates are captured just before transmitting the notification to the geofencing service over the cellular network.

At block 303, the geofencing service pushes the geofence configuration to a device(s) to be monitored. Each of the one or more devices to be monitored is a device that is connected to a cellular network, such as a mobile/cellular router. The geofencing service can communicate with each of the devices to be monitored (e.g., over the cellular network). For instance, in implementations where the geofencing service executes as part of an SD-WAN controller, each device to be monitored has been onboarded with the controller. The geofencing service pushes the geofence configuration to each of the onboarded devices. On installation of the geofence configuration to each device, location-based services of the device can then monitor the device location and detect geofence entry/exit events that trigger generation of a notification. The geofence radius may be configured as a parameterized value that is initialized with the value specified at block 301.

At block 305, the geofencing service awaits a notification triggered by a device crossing the geofence. Notifications triggered by devices crossing the geofence are transmitted to the geofencing service over the cellular network. At block 307, the geofencing service receives a notification comprising coordinates of the device corresponding to both generation and transmission of the notification. Installation of the geofence configuration configured the device(s) to utilize location-based services to capture different coordinates as part of handling a geofence crossing event and include the coordinates in the resulting notification as data and/or metadata. The first coordinates included in the notification indicates the location of the device when the geofence was crossed and generation of the notification was triggered. The second coordinates indicate the location of the device just prior to transmitting the notification to the geofencing service over the cellular network. The geofencing service can determine the two coordinates from the notification based on respective data and/or metadata fields.

At block 309, the geofencing service determines a distance between the locations of the device that correspond to notification generation and transmission. The geofencing service may compute the distance based on using the distance formula with each of the coordinates as inputs. The locations should be substantially similar if the device's connection to the cellular network was sufficiently strong when the device crossed the geofence. Poor signal of the cellular network received by the device can cause a delay between local generation of the notification and transmission of the notification over the cellular network to the geofencing service, which will be captured in differences between the coordinates that indicate continued movement of the device after crossing the geofence before a sufficient signal was gained and the notification could be transmitted.

At block 311, the geofencing service determines whether the distance exceeds a threshold. The threshold corresponds to a distance traveled between notification generation and transmission which, if exceeded, may be indicative of the poor connectivity to the cellular network in the geographic location at the site of the geofence which causes delay in notifying the geofencing service that the geofence was crossed. If the distance does not exceed the threshold, operations continue at block 305, where the geofencing service awaits receipt of another notification. If the distance exceeds the threshold, operations continue at block 313.

At block 313, the geofencing service records an error case for the geofence. The geofencing service may maintain indications of error cases recorded for the geofence in a data structure(s). The data structure may indicate or be associated with the configured geofence parameters to distinguish between error cases recorded for different geofence configurations (e.g., different radius values of the geofence).

At block 315, the geofencing service determines if a number of error cases recorded for the geofence exceeds a threshold. The geofencing service can enforce an additional threshold that indicates a maximum number of error cases that is permitted before the geofence is modified, such as due to repeated delays in transmission of notifications indicating geofence crossing events. The threshold may specify that one or multiple error cases are permitted. The geofencing service evaluates the number of error cases recorded for the geofence against this threshold. If the number of error cases does not exceed the threshold, operations continue at block 305, where the geofencing service awaits receipt of another notification. Otherwise, if the number of error cases exceeds the threshold, operations continue at block 317.

At block 317, the geofencing service modifies parameters of the geofence based on signal strength of the cellular network. Example operations for modifying geofence parameters based on cellular network signals strength are described in reference to FIG. 4.

Figure 4:
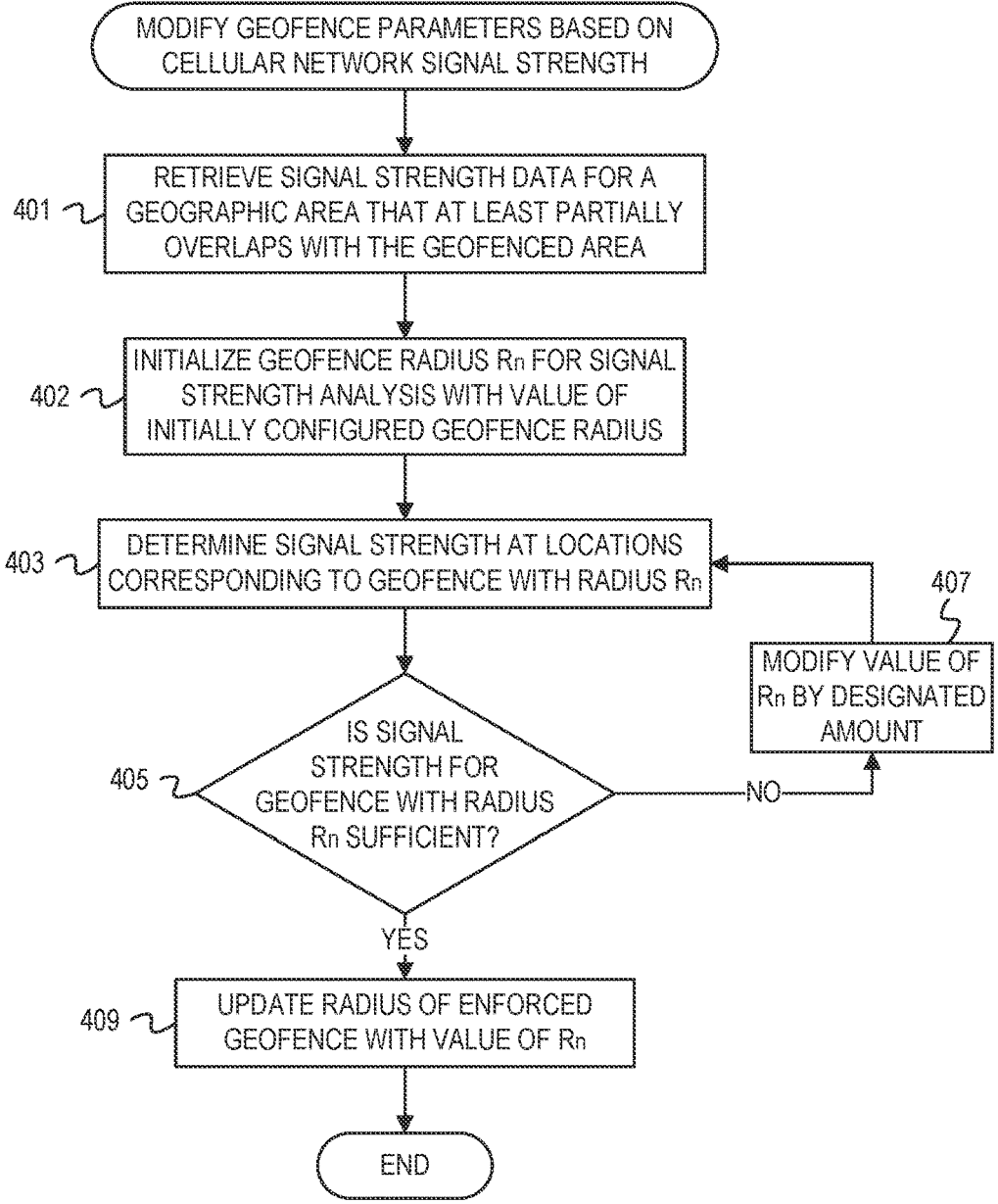
FIG. 4 is a flowchart of example operations for modifying geofence parameters based on cellular network signals strength.

Now referencing FIG. 4, at block 401, the geofencing service retrieves signal strength data for a geographic area that at least partially overlaps with the geofenced area. The signal strength data indicates signal strength of the cellular network in various locations that at least partially overlap/include the geofenced area. The geofencing service can retrieve the signal strength data from a provider of the cellular network (e.g., the ISP) if the provider has made available the signal strength data to the geofencing service. Alternatively, or in addition, the geofencing service can build and maintain a set of signal strength data as the geofencing service receives notifications comprising signal strength measurements as is described in reference to FIG. 6. The signal strength data may be stored in a map so that signal strength measurements are stored in association with their corresponding geographic location. As another example, the signal strength data may be maintained in a heat map, where signal strength measurements have already been classified into one of a plurality of classes indicative of signal strength having corresponding representations (e.g., hues) in the heat map.

At block 402, the geofencing service initializes a geofence radius Rn for signal strength analysis with the value of the initially configured geofence radius. As an example, if the geofence was initially configured with a radius of 1000 meters, the value of Rn is initialized with a value of 1000. The geofencing service can determine this initial geofence radius setting based on the geofence configuration installed thereon and that was initially provided to the monitored device.

At block 403, the geofencing service determines the signal strength at locations corresponding to the geofence with radius Rn. The locations corresponding to the geofence with radius Rn refers to the geographic locations (e.g., in terms of coordinates) that define the boundary formed by the geofence with radius Rn measured from the central point. The geofencing service determines the signal strength data stored in association with these locations corresponding to the geofence with radius Rn, such as the signal strength data corresponding to the set of GPS coordinates that correspond to the geofence with radius Rn. Since signal strength data may be unavailable for the particular locations corresponding to the geofence but may be stored in association with nearby locations, the geofencing service may further determine the signal strength for locations within a given distance of the locations corresponding to the geofence. As an example, the geofencing service may determine the signal strength data that has been stored for locations corresponding to the geofence and for locations within 1 degree of latitude and/or longitude of those locations. The determined signal strength may be represented as a value (e.g., decibel-milliwatts (dBm)) and/or a label, tag, etc. indicative of signal quality. Alternatively, or in addition, the determined signal strength may be represented with a color indicating signal quality if the data were represented with a heat map.

At block 405, the geofencing service determines if the signal strength corresponding to the geofence with radius Rn is sufficient. The geofencing service analyzes the determined signal strength data based on one or more criteria for determining that signal strength in areas corresponding to a geofence is sufficient. The criteria may indicate that the signal strength is sufficient if most (e.g., 85%) of the signal strength data determined to correspond to the geofence has a designated quality rating or satisfies a signal strength threshold, where the value of "most" is a configurable percentage, fraction, etc. As an example, the criteria may indicate that the signal strength can be considered to be sufficient if at least 85% of the signal strength measurements are between 0 and −90 dBm and/or are associated with a label, tag, etc. indicating that the signal quality is good or sufficient. For instance, if the signal strength data are maintained in a heat map, the label/tag indicating a signal quality that is good or sufficient may indicate a color that is used for signal strength measurements classified as "good" (e.g., green). The geofencing service in this example will determine if at least 85% of the signal strength data determined to correspond to the geofence are labeled/tagged with the color indicating good or sufficient signal strength. If the signal strength is insufficient, operations continue at block 407. If the signal strength is sufficient, operations continue at block 409.

At block 407, the geofencing service modifies the value of Rn by a designated amount. The value of Rn can be modified by incrementing Rn or decrementing Rn by a configurable amount, such as 50 or 100 meters. Whether Rn is incremented or decremented depends on whether geofence exit or entry events trigger notifications. For instance, Rn can be decremented if geofence exit events trigger notifications. Operations continue at 403 with another determination and analysis of the signal strength in areas corresponding to the geofence having the modified radius value.

At block 409, the geofencing service updates the radius of the enforced geofence with the value of Rn. The geofencing service updates the geofence radius with the value of Rn so that the geofence will be formed by the boundary with radius Rn measured from the central point. The geofencing service can update the geofence radius with the value of Rn by generating a configuration update to update the radius value or by generating a new geofence configuration and communicating the updated or new geofence configuration to the monitored device(s). As an example, if the geofence radius was indicated as a parameterized value in the geofence configuration, the configuration update may indicate the value of Rn as the parameter value for the geofence radius. As a result, the monitored device(s) will generate and transmit notifications if the modified geofence with the modified radius Rn is crossed after installing the configuration for the geofence update. The geofencing service may further determine the monitored devices for which the geofence is modified based on metadata of the device from which the notification originated. For instance, the geofencing service may communicate the configuration for the geofence modification to the device that sent the notification and any other devices associated with the same service provider as the device.

Figure 5:
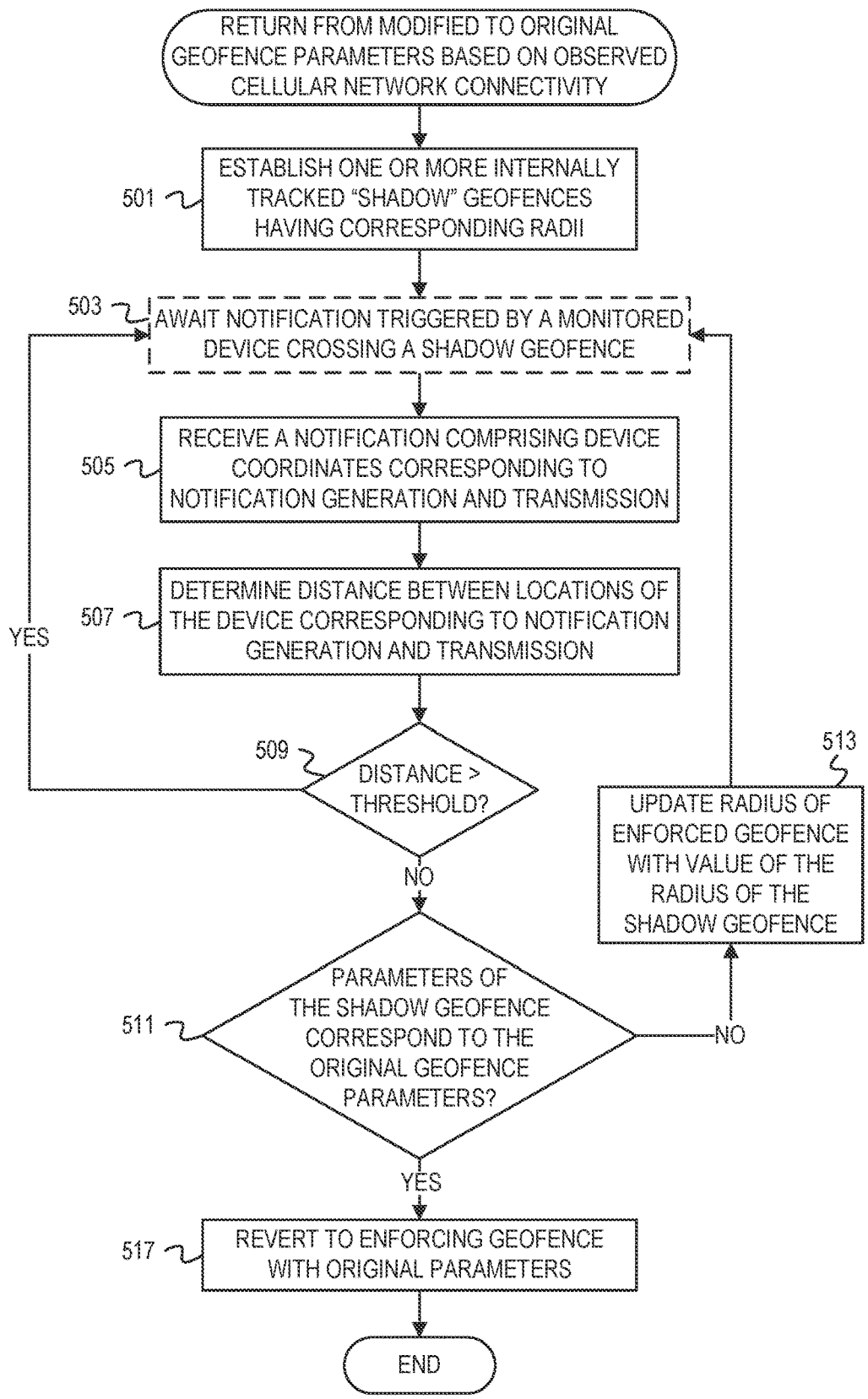
FIG. 5 is a flowchart of example operations for returning from modified to original geofence parameters based on observed cellular network connectivity.

FIG. 5 is a flowchart of example operations for returning from modified to original geofence parameters based on observed cellular network connectivity. After modifying parameters of a geofence enforced for a device connected to a cellular network in response to determining that the geofence corresponded to a site(s) with poor signal strength, it may be desirable to return to the original geofence configuration once a sufficient signal has been restored. The example operations describe returning to the original geofence configuration after modifying the radius of the geofence as described in reference to FIGS. 3-4.

At block 501, the geofencing service establishes one or more shadow geofences having corresponding radii. The geofencing service can establish the shadow geofence(s) by communicating a new geofence configuration or an update to the existing geofence configuration to the monitored device(s) that indicates one or more radii of the shadow geofences and the central point from which the radii are measured. The shadow geofences are referred to as such because alerts generated by devices crossing the shadow geofences are for internal use by the geofencing service and are not configured by or presented to the customer or owner of the devices. Further, the radii of the shadow geofences may be represented as relative to the radius of the initial configured geofence (e.g., as a fraction, percentage, etc.) and can comprise values in between the modified radius determined as described in reference to FIG. 4 and the original geofence radius, resulting in internally tracked geofences that may be considered to be "shadows" of the enforced geofence. As an example, the shadow geofence radii may correspond to 50%, 75%, and 100% of the original radius, or 500 meters, 750 meters, and 1000 meters for a geofence originally configured with a radius of 1000 meters.

At block 503, the geofencing service awaits a notification triggered by a monitored device crossing a shadow geofence. The shadow geofence(s) overlay the actual, enforced geofence, so devices crossing any geofence will trigger a notification sent to the geofencing service. The geofencing service can distinguish between crossing events of shadow geofences and the actual geofence to determine whether to indicate the geofence crossing event to the customer/owner of the device(s) or to analyze data/metadata associated with the crossing event to aid in modifying the parameters of the enforced geofence. For instance, notifications communicated from devices may indicate the geofence that was crossed, from which the geofencing service can determine whether the indicated geofence is the actual geofence or a shadow geofence. As another example, the geofencing service can determine the distance from the central point to the location at which the geofence was crossed that is indicated in the notification (e.g., based on leveraging the distance formula) and determine whether the distance corresponds to a radius of a shadow geofence or the actual, enforced geofence. If the notification indicates that the actual geofence was crossed rather than a shadow geofence, the geofencing service handles the notification as described in reference to FIG. 3 beginning at block 307.

At block 505, the geofencing service receives a notification comprising device coordinates that correspond to generation and transmission of the notification. Notifications generated and transmitted to the geofencing service when a device crosses a shadow geofence comprise similar data/metadata as to notifications generated after crossing an actual, configured geofence (e.g., as described above in reference to 307). Thus, the notification comprises first coordinates determined by the corresponding device's location-based services when the geofence is crossed and second coordinates determined when the notification is transmitted over the cellular network.

At block 507, the geofencing service determines a distance between the locations of the device corresponding to generation and transmission of the notification, such as by utilizing the distance formula to compute the distance between the coordinates. At block 509, the geofencing service determines if the distance exceeds a threshold. The geofencing service may evaluate distances between generation and transmission of notifications corresponding to shadow geofences against the same threshold as was used for the evaluation that triggered the initial geofence modification or may maintain an additional threshold for evaluations pertaining to shadow geofences. With this evaluation, a distance that does not exceed the threshold indicates that the quality of the connection to the cellular network at the location corresponding to the shadow geofence is sufficient, and the geofence can be modified to correspond to the shadow geofence. If the distance exceeds the threshold, operations continue at block 503, where the geofencing service awaits receipt of another notification. If the distance does not exceed the threshold, connectivity to the cellular network may have improved, and operations continue at block 511.

At block 511, the geofencing service determines if the parameters of the shadow geofence correspond to the originally configured geofence parameters. If the shadow geofence has the same radius as that with which the geofence was initially configured prior to geofence parameter modification and there was no substantial delay between generation and transmission of the notification, sufficient connectivity at sites of the initially configured geofence may have been restored. The geofencing service may make the determination based on information included in the notification. For instance, the geofencing service may determine whether the distance between the location at which the geofence was crossed (i.e., as indicated by the corresponding coordinates) and the central point is substantially equivalent to the initial geofence radius. If the parameters of the shadow geofence that was crossed correspond to the initially configured geofence parameters, operations continue at block 517. Otherwise, the geofence was another shadow geofence, and operations continue at block 513.

At block 513, the geofencing service updates the radius of the enforced geofence with the value of the radius of the shadow geofence. The geofencing service updates the geofence radius with the value of the shadow geofence's radius to again modify the geofence that is enforced. As an example, for a case in which geofence exit events trigger notifications, if the enforced geofence had a radius of 500 meters and a device crossed a shadow geofence with a radius of 750 meters, the radius of the geofence to be enforced is modified from 500 meters to 750 meters. The geofencing service can update the geofence radius by generating a configuration update to update the radius value or by generating a new geofence configuration and communicating the updated or new geofence configuration to the monitored device(s). As an example, if the geofence radius was indicated as a parameterized value in the geofence configuration, the configuration update may indicate the value the shadow geofence radius as the parameter value for the geofence radius.

At block 517, the geofencing service reverts to enforcing the geofence with the original parameters. Returning to the previous example, if the geofence was initially configured with a radius of 1000 meters, the geofencing service returns the radius of the enforced geofence to 1000 meters. The geofencing service may generate a new geofence configuration or a geofence configuration update that is transmitted to the monitored device(s) that indicates the original geofence radius and dictates that the shadow geofences should no longer trigger notification. For instance, the geofencing service may disable the shadow geofence triggers for the device(s) in the configuration update.

After returning to enforcement of the initially configured geofence, on receipt of subsequent notifications from devices crossing the geofence, the geofencing service can perform additional geofence modifications as described in reference to FIGS. 3-5. In particular, the geofencing service can repeat the analysis described in reference to FIGS. 3-4 for the first subsequent geofence modification and then revert to the initially configured geofence if connectivity to the cellular network improves as described in reference to FIG. 5. Enforcement of a dynamically modifiable geofence for one or more devices where the geofence modification are informed by connectivity of the device(s) to the cellular network is thus ongoing.

Additionally, evaluation of received notifications and/or any resulting geofence modifications may be implemented as synchronous operations. If the geofencing service receives another notification while evaluating the notification and performing any parameter modification as is described by the example operations of FIGS. 3-5, the geofencing service may queue the notification so the corresponding evaluation and parameter modification are performed upon completion of the evaluation in progress. Queueing received notifications for synchronous evaluation and parameter modification ensures that notifications are handled in the order that they are received to ensure that recorded error cases are accurate and to prevent communication of conflicting configuration updates to devices for which the geofence is enforced.

Figure 6:
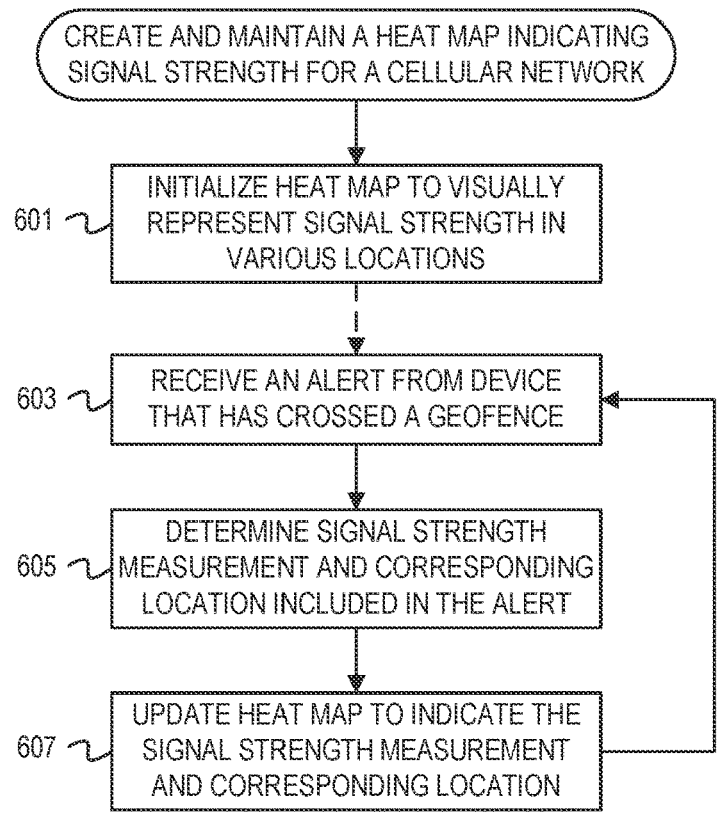
FIG. 6 is a flowchart of example operations for creating and maintaining a heat map indicating signal strength for a cellular network.

FIG. 6 is a flowchart of example operations for creating and maintaining a heat map indicating signal strength for a cellular network. As described above, the geofencing service can modify the radius of a geofence based on data indicating signal strength of a cellular network at various locations so that the geofence corresponds to areas with sufficient signal strength for transmission of notifications triggered by geofence crossing events to the geofencing service over the cellular network. This signal strength data may be obtained from the ISP or other provider of the cellular network. Alternatively, or in addition, implementations can utilize signal strength data obtained directly from the device(s) for which the geofence is being enforced. When configuring the devices to notify the geofencing service when a geofence is crossed on entry or exit, whether an actual geofence or a shadow geofence, the geofencing service can also configure the devices to include signal strength of the connection to the cellular network in the generated alert (e.g., as data or metadata of the alert). As is now described, the geofencing service can utilize the signal strength data to build a heat map indicating signal strength across a geographic area corresponding to the geofence or enhance an existing heat map with new data reflecting observed network conditions.

At block 601, the geofencing service initializes a heat map to visually represent signal strength in various locations. Initializing the heat map can include defining ranges of signal strength measurements (e.g., in dBm) that are indicative of signal quality and assigning a color to each range for the heat map representation. As an example, the geofencing service may initialize the heat map with three ranges of signal strength measurements that correspond to signal quality that can be considered good, acceptable, and poor, such as ranges of −85 dBm and lower, between −85 dBm and −100 dBm, and −100 dBm and over, respectively. Example colors that can be assigned to ranges of signal strength measurements are red for a range indicating poor signal quality, yellow for a range indicating acceptable signal quality, and green for a range representing good signal quality.

At block 603, the geofencing service receives an alert from a device that has crossed a geofence. The alert may correspond to a geofence entry/exit event for either an actual geofence or for a shadow geofence as is described in reference to FIG. 3 and FIG. 5, respectively. The alert comprises indications of device location corresponding to alert generation and transmission as described above. The alert data or metadata additionally comprises a value reflecting a measured signal strength of the cellular network in the location at which the device crossed the geofence or at which the notification was transmitted to the geofencing service. The device(s) for which the geofence is enforced have been configured to determine measured signal strength from locally stored data and include the signal strength in alerts triggered by geofence entry/exit events (e.g., as specified in a geofence configuration installed on the device(s)).

At block 605, the geofencing service determines the signal strength measurement and the corresponding location included in the alert. The geofencing service determines the signal strength measurement and location of the device based on the respective data/metadata fields in the alert. The signal strength measurement may be represented in decibels or decibel milliwatts depending on representation used for the cellular network. The location of the device that is determined from the alert may be the location corresponding to generation of the alert or transmission of the alert (referred to above as the "first coordinates" and "second coordinates," respectively) depending on whether the device determined the measured signal strength as part of generating or transmitting the notification.

At block 607, the geofencing service updates the heat map to indicate the signal strength measurement and corresponding location. The geofencing service adds the signal strength measurement to the heat map such that the corresponding visual representation of the signal strength is stored in an entry corresponding to the location. For instance, if the signal strength measured at a first location is −113 dBm, which falls into a range of poor signal strength defined for the heat map and corresponds to the color red, the geofencing service updates an entry corresponding to the first location with the value −113 dBm and the color red as its visual representation. The geofencing service may store signal strength measurements and associated colors determined for various locations for entries corresponding to locations within a certain distance of the location (e.g., in terms of degrees of latitude and/or longitude). Returning to the previous example, the geofencing service may update the entry for the first location in the heat map with the value of −113 dBm and associated color of red and update entries corresponding to locations within 1 second of latitude and longitude of the first location. Operations continue at block 603 to continue building the heat map as additional signal strength data are obtained.

Determining signal strength data included in received alerts and utilizing the signal strength data to build the heat map can as described in FIG. 6 be performed as part of geofence parameter modification operations. For instance, on receipt of an alert transmitted from a device that has crossed either a customer-configured geofence or a shadow geofence, the geofencing service can determine indications of device location and signal strength data included in the alert. The geofencing service can update a heat map of cellular network signal strength with the received signal strength data as described in reference to FIG. 6 and analyze the indications of device location to determine whether to modify parameters of the geofence as described above in reference to FIGS. 3-5 at least partially in parallel or concurrently.

While FIG. 6 describes example operations for building and maintaining a heat map for storage of signal strength measurements labeled or tagged with indications of signal quality, implementations may use other representations of the signal strength data. For instance, the geofencing service may maintain or have access to a repository in which associations between locations (e.g., GPS coordinates) and signal strength measurements are stored. The geofencing service inserts locations and corresponding signal strength measurements that are determined from received alerts into the repository. The service may evaluate each signal strength measurement based on criteria for tagging or labeling measurements and label or tag the location and signal strength measurement accordingly based on the satisfied criterion prior to insertion into the repository. For instance, the geofencing service may evaluate the signal strength measurement based on one or more ranges corresponding to signal quality as also described at block 601. Once the range into which the signal strength measurement falls is determined, the geofencing service labels or tags the signal strength measurement and location with an indication of the signal quality corresponding to that range. Each entry in the repository in this example thus indicates a location, a signal strength measurement corresponding to that location, and a label/tag indicative of quality of the signal strength at the location.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, with respect to FIG. 6, the operations depicted in blocks 603-607 can be performed in parallel or concurrently if multiple alerts are received. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
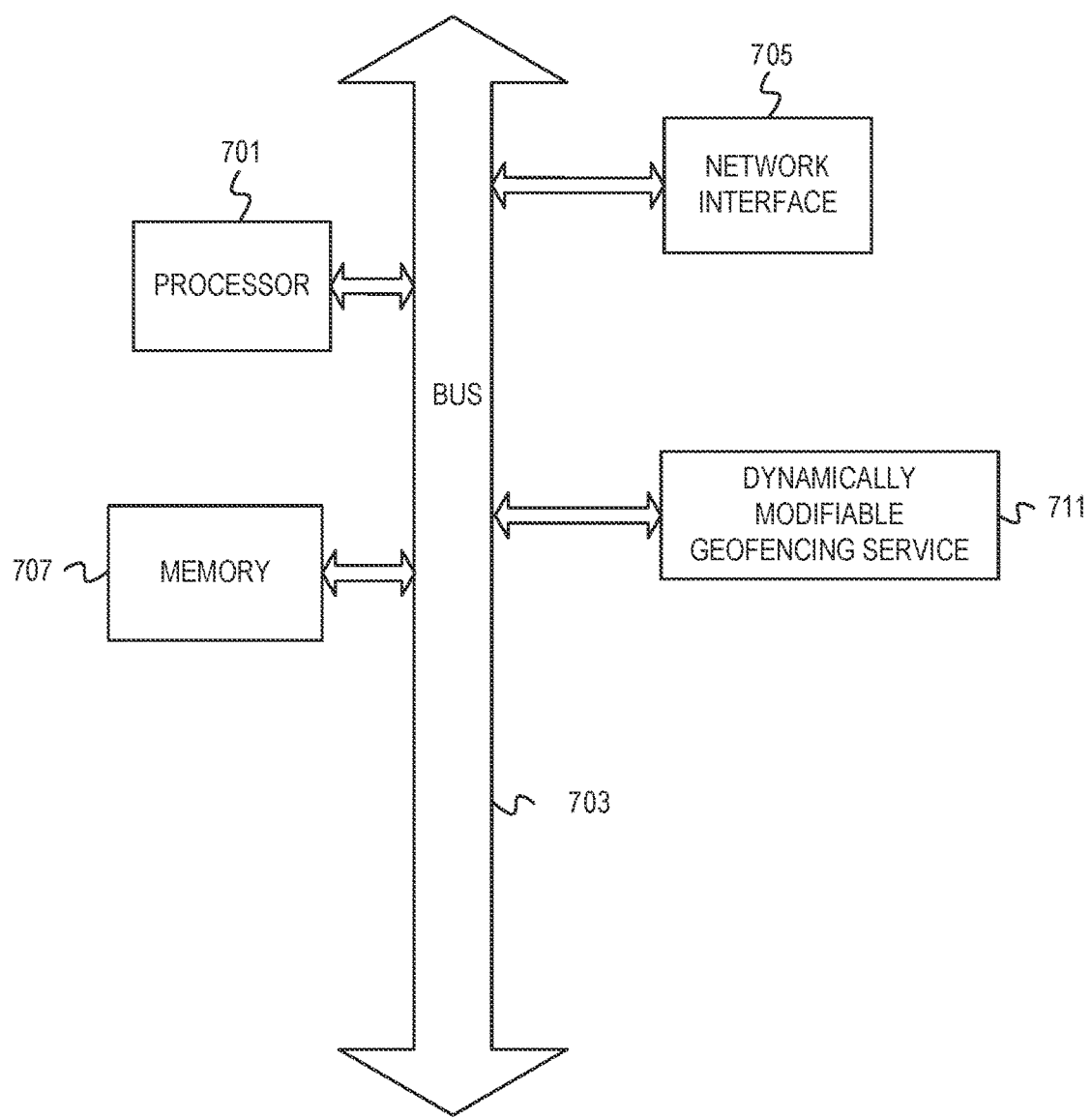
FIG. 7 depicts an example computer system with a dynamically modifiable geofencing service.

FIG. 7 depicts an example computer system with a dynamically modifiable geofencing service. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes dynamically modifiable geofencing service 711. The dynamically modifiable geofencing service 711 creates and maintains a dynamically modifiable geofence that is enforced for one or more devices connected to a cellular network, where the geofence can be modified based on conditions of a cellular network identified from data obtained from the device(s). Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for enforcing a dynamically modifiable geofence based on conditions of a cellular network as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:
enforcing a first geofence having a radius with a first value for a device, wherein the device is connected to a cellular network;
based on receiving an alert triggered by the device crossing the first geofence, determining if a delay associated with generation and transmission of the alert satisfies first criteria for modification of the radius based on indications of location identified in the alert;
based on determining that the delay satisfies the first criteria, modifying the radius from the first value to a second value to create a second geofence; and
enforcing the second geofence for the device.

2. The method of claim 1, wherein the indications of location comprise indications of first and second locations of the device, and wherein the first location corresponds to a location at which the alert was generated locally at the device and the second location corresponds to a location at which the alert was transmitted by the device over the cellular network.

3. The method of claim 2 further comprising determining a distance between the first location and the second location, wherein the distance between the first and second locations indicates the delay associated with generation and transmission of the alert.

4. The method of claim 3, wherein the first criteria comprise a first threshold, and wherein determining if the delay satisfies the first criteria comprises determining if the distance exceeds the first threshold.

5. The method of claim 4 further comprising recording an error case for the first geofence based on determining that the distance exceeds the first threshold, wherein determining if the delay satisfies the first criteria is also based on determining if a count of error cases recorded for the first geofence exceeds a second threshold.

6. The method of claim 1 further comprising:
based on modifying the radius, internally enforcing a plurality of geofences having corresponding ones of a plurality of radii for the device, wherein each of the plurality of geofences triggers an internal alert when crossed;
based on receiving an internal alert triggered by the device crossing a third geofence of the plurality of geofences, determining if a delay associated with receiving the internal alert satisfies second criteria for modification of the radius;
modifying the radius from the second value to a third value to create a third geofence based on determining that the delay satisfies the second criteria; and
enforcing the third geofence for the device.

7. The method of claim 6, wherein determining if the delay associated with receiving the internal alert satisfies the second criteria comprises determining if a distance between a first location at which the internal alert was generated locally and a second location at which the alert was transmitted by the device over the cellular network is below a third threshold, wherein the internal alert indicates the first and second locations.

8. The method of claim 6 further comprising repeating the enforcing of the plurality of geofences, receiving of an internal alert, determining that the delay satisfies the second criteria, and modifying of the radius until the radius is returned to the first value.

9. The method of claim 1, wherein modifying the radius from the first value to the second value is based on data indicating signal strength for the cellular network at a plurality of locations.

10. The method of claim 9, wherein modifying the radius comprises analyzing the data indicating signal strength and determining that a signal strength of the cellular network at a first subset of the plurality of locations corresponding to the second geofence is sufficient.

11. The method of claim 9 further comprising obtaining at least a subset of the data indicating signal strength for the cellular network from the device, wherein alerts received from the device comprise signal strength measurements of the cellular network.

12. One or more non-transitory machine-readable media having program code stored thereon, the program code comprising instructions to:
establish a first geofence having a radius with a first value, wherein the first geofence is enforced for a device that is connected to a cellular network;
based on analysis of device location data identified in a received alert triggered by the device crossing the first geofence, determine whether a delay between generation and transmission of the alert satisfies first criteria for modification of the radius;
based on a determination that the delay satisfies the first criteria, modify the radius from the first value to a second value to create a second geofence; and
communicate an indication of the second value of the radius to the device to enforce the second geofence for the device.

13. The non-transitory machine-readable media of claim 12, wherein the device location data indicate a first location of the device when the alert was generated and a second location of the device when the alert was transmitted over the cellular network, and wherein the instructions to determine whether the delay satisfies the first criteria comprise instructions to determine whether a distance between the first location and the second location exceeds a first threshold.

14. The non-transitory machine-readable media of claim 13, wherein the program code further comprises instructions to record an error case for the first geofence based on a determination that the distance exceeds the first threshold, and wherein the instructions to determine whether the delay satisfies the first criteria comprise instructions to determine whether a count of error cases recorded for the first geofence exceeds a second threshold.

15. The non-transitory machine-readable media of claim 12, wherein the program code further comprises instructions to return the radius to the first value based on a determination that connectivity to the cellular network at locations corresponding to the first geofence has been restored.

16. An apparatus comprising:
a processor; and
a computer-readable medium having instructions stored thereon that are executable by the processor to cause the apparatus to,
enforce a first geofence having a radius with a first value for one or more devices, wherein each of the one or more devices is connected to a cellular network;
based on receipt of an alert triggered by a first device of the one or more devices crossing the first geofence, determine if a delay associated with generation and transmission of the alert satisfies first criteria for modification of the radius based on indications of location of the first device identified in the alert;
based on a determination that the delay satisfies the first criteria, modify the radius from the first value to a second value to create a second geofence; and
enforce the second geofence for the one or more devices.

17. The apparatus of claim 16 further comprising instructions executable by the processor to cause the apparatus to determine a distance between the indications of location of the first device, wherein the indications of location of the first device comprise an indication of a first location at which the alert was generated locally at the first device and an indication of a second location at which the alert was transmitted by the first device over the cellular network, and wherein the distance is between the first and second locations.

18. The apparatus of claim 17, wherein the first criteria comprise a first threshold, and wherein the instructions executable by the processor to cause the apparatus to determine if the delay satisfies the first criteria comprise instructions executable by the processor to cause the apparatus to determine if the distance exceeds the first threshold.

19. The apparatus of claim 18 further comprising instructions executable by the processor to cause the apparatus to record an error case for the first geofence based on a determination that the distance exceeds the first threshold, and wherein the instructions executable by the processor to cause the apparatus to determine that the delay satisfies the first criteria comprise instructions executable by the processor to cause the apparatus to determine that a count of error cases recorded for the first geofence exceeds a second threshold.

20. The apparatus of claim 16, wherein the instructions executable by the processor to cause the apparatus to modify the radius from the first value to the second value comprise instructions executable by the processor to cause the apparatus to modify the radius based on data indicating signal strength for the cellular network at a plurality of locations.

* * * * *